No. 693,865. Patented Feb. 25, 1902.
A. HUCK.
FAUCET.
(Application filed July 12, 1901.)
(No Model.)
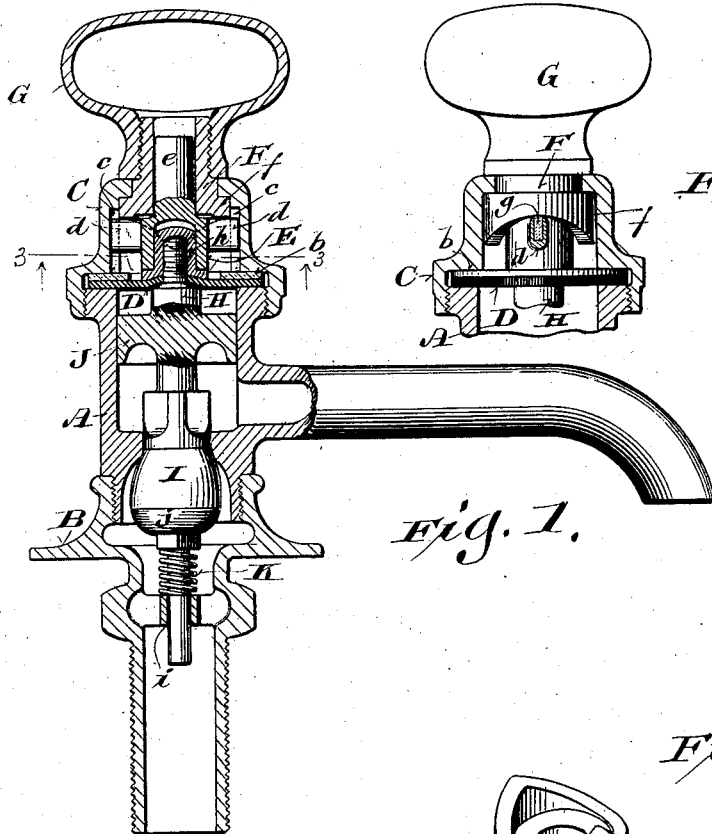
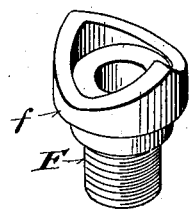
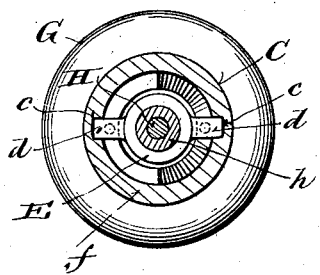
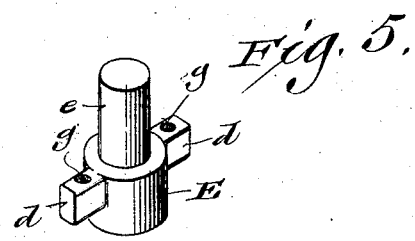
Witnesses:
Geo. W. Young
N. E. Oliphant
Inventor
Albert Huck
By H. G. Underwood
Attorneys
THE NORRIS PETERS CO., PHOTO-LITHO., WASHINGTON, D. C.

UNITED STATES PATENT OFFICE.

ALBERT HUCK, OF MILWAUKEE, WISCONSIN, ASSIGNOR TO MILWAUKEE VALVE COMPANY, OF MILWAUKEE, WISCONSIN.

FAUCET.

SPECIFICATION forming part of Letters Patent No. 693,865, dated February 25, 1902.

Application filed July 12, 1901. Serial No. 67,938. (No model.)

*To all whom it may concern:*

Be it known that I, ALBERT HUCK, a citizen of the United States, and a resident of Milwaukee, in the county of Milwaukee and State of Wisconsin, have invented certain new and useful Improvements in Faucets; and I do hereby declare that the following is a full, clear, and exact description thereof.

My invention has for its object to provide simple, economical, self-closing, noiseless faucets the handles of which are restricted to rotary movement and automatically lubricated, said invention consisting in certain peculiarities of construction and combination of parts hereinafter particularly set forth with reference to the accompanying drawings and subsequently claimed.

Figure 1 of the drawings represents a partly-sectional view of a basin-faucet made to embody my improvements; Fig. 2, a similar view of a portion of the faucet; Fig. 3, a horizontal section indicated by line 3 3 in the first figure; Fig. 4, a perspective view of a cam-section of the faucet-handle, and Fig. 5 a similar view of a cross-head that opposes the cam-section of said handle.

Referring by letter to the drawings, A indicates the spout-section, B the base or pipe section, and C the cap of the shell portion, of a basin-faucet embodying my improvements, these parts being in screw-thread connection one with another. A flexible diaphragm D and washer *b* are interposed between spout-section A and cap C of the faucet-shell. The cap is provided with diametrically opposite inner guide-grooves *c* for the arms *d* of a cross-head E, the round shank *e* of which fits loose in a flanged and shouldered sleeve F, having match fit with said cap, through which it projects, the flange *f* of the sleeve being concave against said arms of the cross-head. The sleeve F constitutes what is herein termed the "cam-section" of the faucet-handle, the other exposed handpiece-section G of said handle being in screw-thread connection with said sleeve against the shell-cap.

The cross-head arms *d* are provided with vertical recesses filled with lubricating material *g*, and incidental to wear of said arms by the cam-section of the faucet-handle the lubricant is automatically supplied to the opposing concave surfaces.

Cross-head E fits loose on a nipple *h* in screw-thread connection with the reduced upper end of a stem H, extending through diaphragm D central of same, the nipple serving to clamp said diaphragm in connection with the stem. The faucet-valve I on stem H is of the ordinary compressible-plug variety, and in one piece with said stem (or otherwise rigid therewith) is a piston J, that plays in the spout-section of the faucet-shell above the outlet of same. The lower end of the valve-stem is shown extending through a guide *i* in the base or pipe section of the faucet-shell, and a spiral spring K is arranged to surround said stem between said guide and the expander *j* for the valve. However, the guide *i*, spring K, and so much of stem H as is herein illustrated below the valve-expander *j* may be omitted without a departure from the scope of my invention.

From the foregoing it will be readily understood that the faucet-handle is restricted to rotary movement, and this movement being had in either direction the cam-section of said handle will operate against the arms *d* of cross-head E to unseat valve I against water-pressure and resistance of spring K if the latter be utilized as a part of the faucet. On release of the handle upward pressure against the valve and piston J operates to reseat said valve, friction of the cross-head arms on the cam-section of said handle causing the necessary reverse movement of the latter. The piston J not being absolutely tight in the faucet-shell, water will find its way into the space between said piston and diaphragm D when the valve is unseated, and this water after serving as a cushion to prevent concussion in the faucet leaks down to find escape through the faucet-spout when said valve is reseated.

Having thus described my invention, what I claim as new, and desire to secure by Letters Patent, is—

1. A faucet having a flexible diaphragm therein held in connection with the valve-stem thereof by a clamp-nipple, a nipple-fitting cross-head for which guides are provided longitudinally of the faucet-shell, and a handle restricted to rotatory movement in cam contact with the cross-head arms.

2. A faucet having a flexible diaphragm therein held in connection with the valve-stem thereof by a clamp-nipple, a nipple-fitting cross-head for which guides are provided longitudinally of the faucet-shell, a handle restricted to rotatory movement in cam contact with the cross-head arms, and lubricating material in recesses of said arms opposing the cam-surfaces of the handle.

3. A faucet having a flexible diaphragm therein held in connection with the valve-stem thereof by a clamp-nipple, a nipple-fitting cross-head for which guides are provided longitudinally of the faucet-shell, a handle restricted to rotatory movement in cam contact with the cross-head arms, and a piston on said valve-stem within the spout-section of said shell between the outlet of same and said diaphragm.

4. A faucet having a flexible diaphragm therein held in connection with the valve-stem thereof by a clamp-nipple, a nipple-fitting cross-head for which guides are provided longitudinally of the faucet-shell, a handle restricted to rotatory movement in cam contact with the cross-head arms, a guide for the inner end of said valve-stem, and a spiral spring arranged to surround the aforesaid stem intermediate of the valve and said guide.

5. A faucet having a flexible diaphragm therein held in connection with the valve-stem thereof by a clamp-nipple, a nipple-fitting cross-head for which guides are provided longitudinally of the faucet-shell, a flanged and shouldered sleeve in match fit with the shell-cap and loose on a shank of the cross-head, the flange of this sleeve being concave against the cross-head arms, and a handpiece in screw-thread union with the sleeve against said shell-cap.

6. A faucet having a flexible diaphragm therein held in connection with the valve-stem thereof by a clamp-nipple, a nipple-fitting cross-head for which guides are provided longitudinally of the faucet-shell, a flanged and shouldered sleeve in match fit with the shell-cap and loose on a shank of the cross-head, the flange of this sleeve being concave against the cross-head arms, a handpiece in screw-thread union with the sleeve against said shell-cap, and lubricating material in recesses of said cross-head arms opposed to the concave surfaces of said sleeve.

In testimony that I claim the foregoing I have hereunto set my hand, at Milwaukee, in the county of Milwaukee and State of Wisconsin, in the presence of two witnesses.

ALBERT HUCK.

Witnesses:
N. E. OLIPHANT,
B. C. ROLOFF.